(12) United States Patent
Sohn et al.

(10) Patent No.: US 9,068,843 B1
(45) Date of Patent: Jun. 30, 2015

(54) INERTIAL SENSOR FUSION ORIENTATION CORRECTION

(71) Applicant: Amazon Technologies, Inc., Seattle, WA (US)

(72) Inventors: Jung Bae Sohn, Sunnyvale, CA (US); David William Devries, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/497,512

(22) Filed: Sep. 26, 2014

(51) Int. Cl.
*A63F 13/00* (2014.01)
*G01C 21/18* (2006.01)
*H04W 4/02* (2009.01)
*G06F 3/03* (2006.01)
*G06F 3/0346* (2013.01)

(52) U.S. Cl.
CPC ............... *G01C 21/18* (2013.01); *H04W 4/027* (2013.01); *G06F 3/03* (2013.01); *G06F 3/0346* (2013.01)

(58) Field of Classification Search
None
See application file for complete search history.

(56) References Cited

U.S. PATENT DOCUMENTS 8,282,487 B2 * 10/2012 Wilson et al. ................... 463/39
8,515,707 B2 *  8/2013 Joseph et al. .................. 702/141
8,552,978 B2 * 10/2013 Ye et al. ......................... 345/157
8,907,893 B2 * 12/2014 Shaw et al. .................... 345/156
2011/0260968 A1 * 10/2011 Ye et al. ......................... 345/158
2012/0086725 A1 *  4/2012 Joseph et al. .................. 345/629
2014/0111433 A1 *  4/2014 Solomon et al. .............. 345/158

OTHER PUBLICATIONS

Grubin. Derivation of the Quaternion Scheme via the Euler Axis and Angle. Journal of Spacecraft and Rockets. vol. 7, No. 10, pp. 1261-1263, 1970.
Grubin. Quaternion Singularity Revisited. Journal of Guidance, Control, and Dynamics. vol. 2, No. 3, pp. 255-256, 1979.
Klumpp. Singularity-Free Extraction of a Quaternion From a Direction-Cosine Matrix. Journal of Spacecraft and Rockets. vol. 13, No. 12, pp. 754-755, 1976.
Madgwick. An Efficient Orientation Filter for Inertial and Inertial/Magnetic Sensor Arrays. Report x-io and University of Bristol (UK), 2010.
Rodriguez. Kalman Filtering, Smoothing, and Recursive Robot Arm Forward and Inverse Dynamics. Jet Propulsion Laboratory. Dec. 1, 1986.

* cited by examiner

*Primary Examiner* — Redhwan K Mawari
*Assistant Examiner* — Edward Torchinsky
(74) *Attorney, Agent, or Firm* — Seyfarth Shaw LLP (57) ABSTRACT

A system for determining and correcting a calculated orientation of a computing device based on data from an accelerometer and a gyroscope. The system compares a predicted direction of gravity in a predicted frame of the device with a measured direction of gravity in a sensor frame of the device, and determines an angle of the difference between the directions. A correction is calculated to rotate the predicted frame around an axis by the angle relative to a sensor frame, the axis being perpendicular to both the predicted and measured directions of gravity. A predicted orientation of a reference "Earth" frame relative to the predicted frame is calculated based on the gyroscope data. A corrected orientation is determined by applying the correction to the predicted orientation, providing an orientation of the Earth reference frame relative to the sensor frame.

20 Claims, 6 Drawing Sheets

FIG. 12

INERTIAL SENSOR FUSION ORIENTATION CORRECTION

BACKGROUND

Handheld and wearable electronic devices regularly include navigation capability and often include features to determine device orientation or other internal sensors. Some devices have multiple radios, including WiFi and Bluetooth. Many also provide a graphical user interface (GUI) and touch screen via which the user may interact with the GUI.

BRIEF DESCRIPTION OF DRAWINGS

For a more complete understanding of the present disclosure, reference is now made to the following description taken in conjunction with the accompanying drawings. All angles described herein are in radians unless otherwise stated.

DETAILED DESCRIPTION

Certain computing devices may be configured with user interfaces and/or software applications controlled in part by changes in device orientation and inertial motion. It is important with such devices to carefully track changes in the device's motion so that the UI and/or application that depends on the motion operates properly. Such devices may include an IMU (Inertial Measurement Unit). An IMU comprises a three-axis gyroscope to measure rotational movement and a three-axis accelerometer to measure acceleration, and a three-axis magnetometer to provide compass direction. With the exception of the direction of gravity which acts as a downward acceleration on the device which can be measured by the accelerometer, an IMU by itself only has the magnetometer data to determine how the device's reference frame relates to an "absolute" reference frame. However, the measured direction of gravity may be inaccurate due to device acceleration, and data from magnetometers may contain a high level of noise and is susceptible to spurious magnetic fields and distortions, corrupting a device's estimate of its own external heading and orientation. As a result, a device's estimate of its own orientation may become decoupled from the external reference frame. Over time, this results in an inaccurate estimate, as drift errors in the gyroscopes and accelerometers accumulate over time.

Various techniques have been developed to compensate for drift and accumulated errors, and to link the device's predicted orientation based on inertial measurements to an external reference frame. However, they tend to be overly reliant on the accuracy the accelerometer's determination of the direction of gravity and the magnetometer readings, and realign the predicted reference frame by simply eliminating the difference with the absolute frame, causing the corrected estimate to be relatively unstable if the absolute frame data is noisy or inaccurate.

An orientation filter may handle the task of integrating the data from the accelerometers, gyroscopes, magnetometers, etc., to provide a single estimate of device orientation. This integration task is sometimes referred to as "sensor fusion." If there is a difference between the device's predicted inertial reference frame and the external reference frame (e.g., an Earth coordinate-based reference frame such as North, East, down) due to drift, error, etc. the orientation filter adjusts the predicted frame to correct the error. How these corrections are made is what distinguishes one orientation filter algorithm from another.

Figure 1:
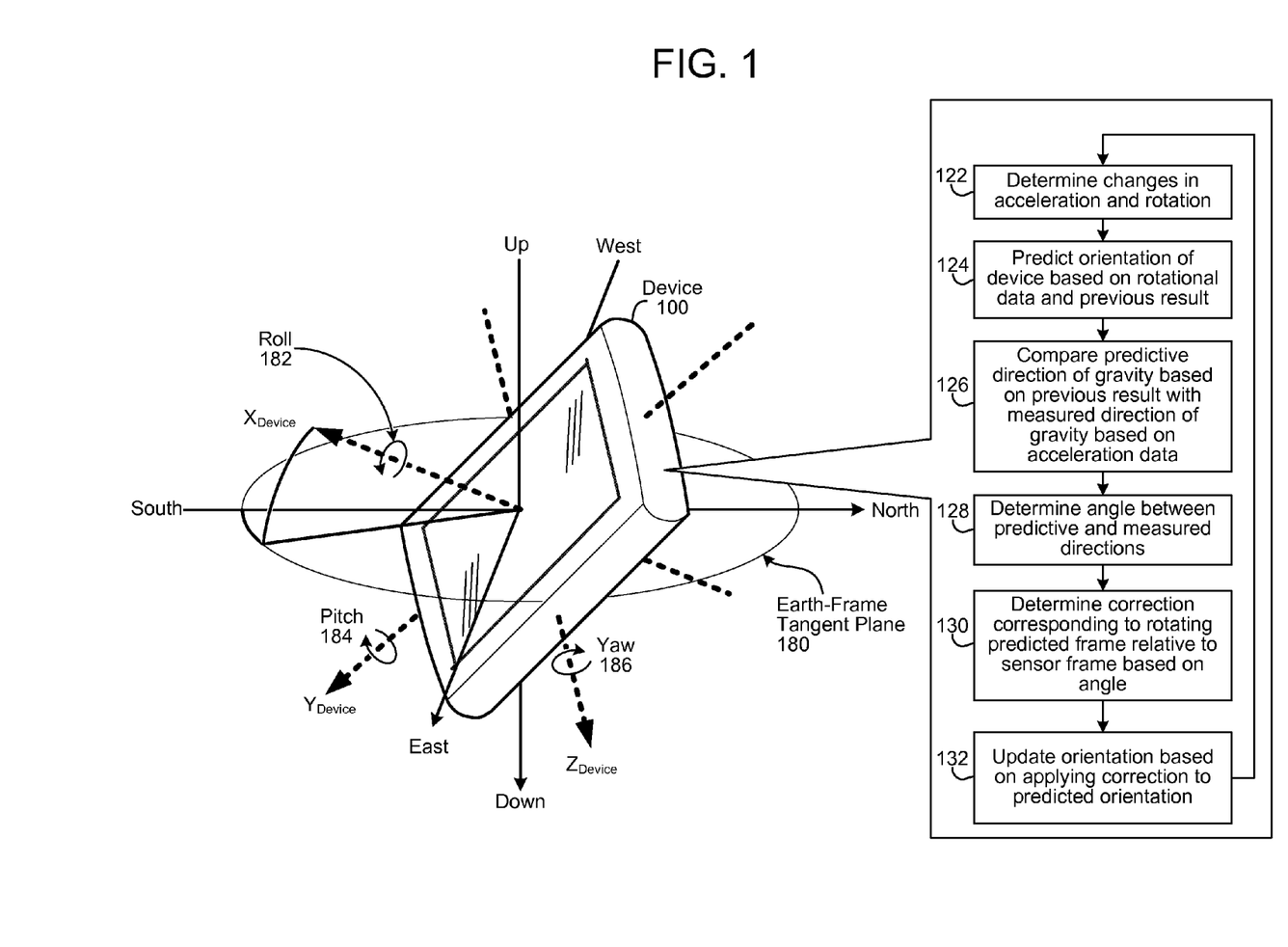
FIG. 1 illustrates a system for correcting an estimation of device orientation.

FIG. 1 illustrates a device 100 employing an improved orientation filter. The Earth coordinate-based reference frame ("Earth reference frame") is illustrated by North, East, and down axes and Cartesian device sensor frame is illustrated as x, y, and z axes. North East Down (NED), also known as local tangent plane (LTP), is a geographical coordinate system in an Earth reference frame that is commonly used in aviation. If the direction of an Earth field (e.g., gravity, magnetic North, etc.) is known in the Earth reference frame, a measurement of that same field within the device's sensor frame (x, y, z) will allow an orientation of the sensor frame relative to the Earth reference frame to be calculated. The North and East axes form the Earth-frame tangent plane 180, and the down axis is perpendicular to the tangent plane 180. The Earth-frame tangent plane 180 is approximately parallel to flat, level ground.

The reference frame axes and/or the sensor frame axes may be expressed as unit vectors. An ordinary vector conveys both a direction and a magnitude. By definition, a unit vector has a magnitude equal to one, such that it only conveys direction.

During operation, the device 100 predicts an orientation of a reference frame (e.g., Earth reference frame) relative to the device's own frame based on rotational changes detected by a three-axis gyroscope of the IMU (e.g., roll 182, pitch 184, and yaw 186). Errors occur if, among other reasons, the prediction of the current state of the reference frame is incorrect (e.g., the device's prediction of North has drifted from actual North), and if the orientation of the reference frame relative to the device's own frame is inaccurate.

Orientation filters commonly use gyroscope data as the primary data source (i.e., as the mathematical integrator over time), and use data from the accelerometers and magnetometers for orientation correction, giving the accelerometer data and magnetometer data equal or near-equal weight. The improved orientation filter separates accelerometer data and magnetometer data. The accelerometer data is likely to be more accurate than the magnetometer data, and therefore greater weight is assigned to the accelerometer data than the magnetometer data.

The improved orientation filter of the device 100 determines (122) changes in acceleration and rotation using a three-axis gyroscope and a three-axis accelerometer. A predicted orientation of the reference frame relative to the device's frame is determined (124) based on the rotational data from the gyroscope and a corrected orientation from a previous iteration. Since there is no corrected orientation from a previous iteration on the first pass, an initial predicted orientation value may be based on unverifiable IMU readings (e.g., magnetometer, gravity) or default values. A virtue of the improved process is that the accuracy of this initial prediction is not critical, as the system will converge toward a stable and accurate determination of the orientation of the reference frame relative to the sensor frame.

A measured direction of gravity based on accelerometer data and a predicted direction of gravity based on the previous corrected orientation are compared (126). An angle is corresponding to a difference between the measured and predicted directions of gravity is determined (128). A correction is determined (130) to rotate a predicted sensor frame of the device based on the angle, relative to the actual sensor frame of the device. The rotation is around an axis perpendicular to both the predicted direction of gravity and the measured direction of gravity. The orientation is then updated (132) based on a combination of the predicted orientation (from 124) and the correction (from 130), with the corrected orientation of the reference frame relative to the sensor frame being the basis of the previous result (e.g., as used in 124 and 126) on the next iteration.

Due to inaccuracies and noise in IMU data, it is not possible to verify the "actual" orientation of the reference frame (e.g. Earth reference frame) relative to the device sensor frame. Even the measured direction of gravity may be inaccurate, which is why prediction and correction of that prediction are important to orientation filter performance. Compared to the prior art approach of correction by subtracting the differences between predicted and measured orientations, the process performed by the improved orientation filter of the device 100 is relatively simple in computational terms, while offering an improvement in performance over time as the frame corrections cause the resulting orientations (from 132) to stably converge toward the "actual" orientation. The corrections do not necessarily eliminate the difference between frames on each iteration, but after multiple iterations, the results approach the "actual" orientation. In comparison, the difference adjustment in the prior art carries instability in the measured IMU data directly into the correction, with corrections swinging with each iteration in accordance with noise-and-inaccuracy swings in the measured data.

Figure 2:
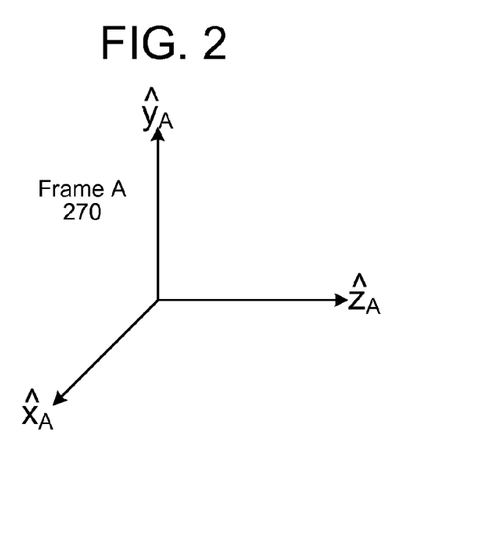
FIGS. 2 and 3 illustrate reference frames.
Figure 3:
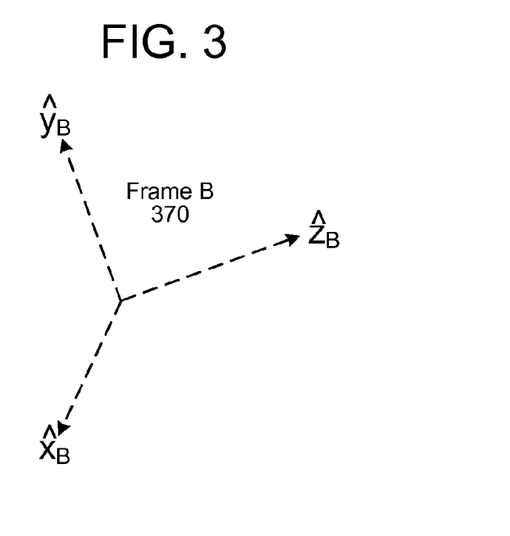

As an explanatory starting point on how the improved orientation filter operates, a change in orientation of the device 100 can be represented by a mathematical expression called a "quaternion." A quaternion is a four-dimensional complex number that can be used to represent the orientation of a rigid body or coordinate frame in three-dimensional space. FIG. 2 illustrates a reference frame A 270 and FIG. 3 illustrates a reference frame B 370. The caret symbol "^" over each of the axes conveys that each of the axes is a unit vector (i.e., has a magnitude of one). The axes in a frame are mutually orthogonal, as is conventional for a Cartesian system. As illustrated, the orientations of frame A and frame B are different.

Figure 4:
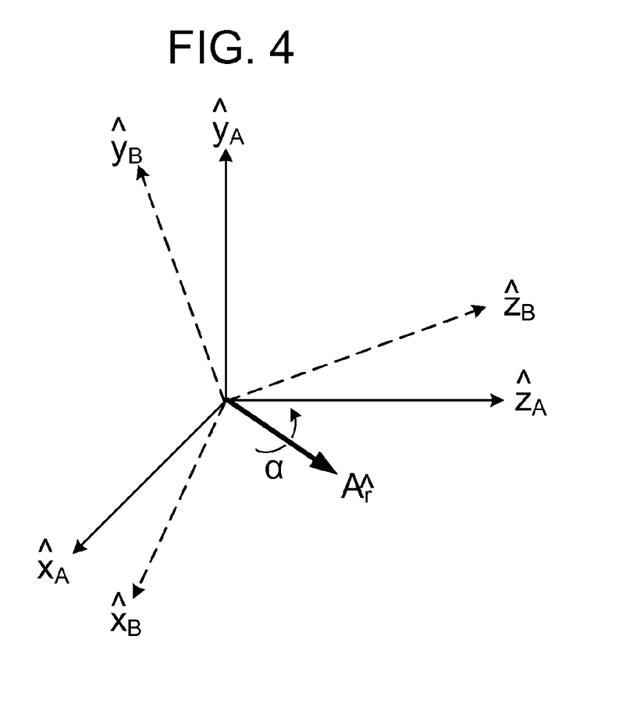
FIG. 4 illustrates how a quaternion can be used to express the difference in frames.

A quaternion can be used to express the difference in orientations between these two reference frames in terms of how one frame must be rotated to align its axes with those of the other frame. An example is illustrated in FIG. 4. An arbitrary orientation of frame B relative to frame A can be achieved by a rotation of an angle α around axis $A_{\hat{r}}$ defined in frame A. This is represented graphically in FIG. 4 where the mutually orthogonal unit vectors $\hat{x}_A$, $\hat{y}_A$, and $\hat{z}_A$, and $\hat{x}_B$, $\hat{y}_B$, and $\hat{z}_B$ define the principle axes of coordinate frames A and B respectively. This may be expressed by the following quaternion $_B^A\hat{q}$ in equation [1], which describes the orientation of frame B relative to frame A, where $A_{\hat{r}}$ is a unit vector described in frame A:

$$_B^A\hat{q} = [\, q_1 \quad q_2 \quad q_3 \quad q_4 \,] = [\, \cos\frac{\alpha}{2} \quad -r_x\sin\frac{\alpha}{2} \quad -r_y\sin\frac{\alpha}{2} \quad -r_z\sin\frac{\alpha}{2} \,] \quad [1]$$

The components $r_x$, $r_y$, and $r_z$ define the direction of the unit vector $A_{\hat{r}}$ relative to the x, y, and z axes of frame A.

The quaternion conjugate, which is denoted by an asterisks symbol "*", can be used to swap the relative frames described by an orientation. For example, $_A^B\hat{q}$ is the conjugate of $_B^A\hat{q}$ and describes the orientation of frame A relative to frame B. The conjugate $_B^A\hat{q}$ is defined by equation [2] as follows:

$$_B^A\hat{q}^* = _A^B\hat{q} = [\, q_1 \quad -q_2 \quad -q_3 \quad -q_4 \,] \quad [2]$$

The quaternion product, denoted by ⊗, can be used to define "compound" orientations. For example, for two orientations described by $_B^A\hat{q}$ and $_C^B\hat{q}$, the compounded orientation $_C^A\hat{q}$ can be defined by equation [3] as follows:

$$_C^A\hat{q} = _C^B\hat{q} \otimes _B^A\hat{q} \quad [3]$$

For two quaternions, a and b, the quaternion product can be determined as defined in equation [4]:

$$a \otimes b = [\, a_1 \quad a_2 \quad a_3 \quad a_4 \,] \otimes [\, b_1 \quad b_2 \quad b_3 \quad b_4 \,] = \begin{bmatrix} a_1b_1 - a_2b_2 - a_3b_3 - a_4b_4 \\ a_1b_2 + a_2b_1 + a_3b_4 - a_4b_3 \\ a_1b_3 - a_2b_4 + a_3b_1 + a_4b_2 \\ a_1b_4 + a_2b_3 - a_3b_2 + a_4b_1 \end{bmatrix}^T \quad [4]$$

The superscript "T" indicates a transpose of the matrix, pivoting the matrix of one column and four rows to be a matrix of four columns and one row. A quaternion product is not commutative, such that a⊗ b is not equal to b⊗ a.

A three dimensional vector can be rotated by a quaternion using the relationship described in equation [5]. The vectors $A_v$ and $B_v$ are the same vector described in frame A and frame B respectively, where each vector contains a zero inserted as the first element to make them four element row vectors, with the second, third, and fourth elements providing x, y, and z directions.

$$B_v = _B^A\hat{q} \otimes A_v \otimes _B^A\hat{q}^* \quad [5]$$

Further background discussion of quaternion mathematics is presented by Sebastian O. H. Madgwick in "An efficient orientation filter for inertial and inertial/magnetic sensor arrays," published by the University of Bristol in 2010, which is incorporated herein by reference.

A "sensor frame" refers to the relative orientation of the x, y, and z axes based on sensor data, as shown, for example, in FIGS. 2 and 3. A quaternion expressing a rotation of an Earth reference frame "E" (e.g., North, East, down) with respect to a measured inertial device sensor frame "s" (e.g., based on IMU data) is expressed in equation [6]:

$$_E^S \hat{q} \triangleq \begin{bmatrix} q_1 \\ q_2 \\ q_3 \\ q_4 \end{bmatrix} \qquad [6]$$

The sensor frame's gyroscopic angular velocity ω around a particular axis, as determined from the IMU, are expressed in equation [7]:

$$s_\omega \triangleq [\, 0 \quad \omega_x \quad \omega_y \quad \omega_z \,]^T \qquad [7]$$

Referring back to FIG. 1, $\omega_x$ corresponds to roll 182, $\omega_y$ corresponds to pitch 184, and $\omega_z$ corresponds to yaw 186.

Gyroscope data is not verifiable in a conventional sense based on measured reality, as IMUs are dependent on the gyroscope to determine how the device pivots. So verification comes from predicting what the device's orientation in reality should be (if the rotational data is correct) and comparing that prediction to the measured "real" North, East, and down frame using accelerometer and/or magnetometer data. For example, after a rotation of the device is measured using gyroscope data, a prediction may be made as to which direction the "down" vector is expected to be in, and which directions the "North" and "East" vectors are expected to be in. The outcome of the determination as to whether the prediction is accurate depends on whether the orientation filter previously had the directions of the real world "Earth" frame correct (since the prediction may be based on rotational changes that have occurred since that previous determination of orientation), whether the newly updated measurements of the real world Earth reference frame are accurate (e.g., whether the accelerometer and/or magnetometer data are accurate), whether the orientation filter previously had correctly calculated the orientation of the Earth reference frame relative to the device's own frame (e.g., the orientation of the North, East, Down Earth reference frame relative to the device's own sensor frame, which is illustrated in FIG. 1 by the $X_{Device}$, $Y_{Device}$, and $Z_{Device}$ axes), and whether the gyroscope data covering the time since the previous frame determination is complete and accurate.

Applying the angular velocity, a change in orientation over time can be expressed as the derivative quaternion in equation [8]:

$$_E^S \dot{q} = \frac{1}{2} {}_E^S \hat{q} \otimes s_\omega \qquad [8]$$

This quaternion derivative describes the rate of change of orientation of the Earth reference frame "E" relative to the sensor frame "s". The orientation of the Earth reference frame relative to the sensor frame at a time "t" can be computed by numerically integrating the quaternion derivative provided that the initial conditions are known. It is this integration that is the basis for determining the "predicted" orientation of the device, represented by the quaternion $_E^S \tilde{q}$, where the tilde symbol "~" over the frame indicates that the sensor frame is predicted.

Correction of the "predicted" orientation is based in part on measured vector observations from the accelerometer and/or magnetometer. For example, a correction may be determined based on a comparison of a predicted direction of gravity in the predicted device frame and a measured direction of gravity in the sensor frame. Given an orientation represented by a quaternion $_E^S \hat{q}$ and a gravity unit vector $E_{\hat{g}}$ in the Earth reference frame equal to a matrix of $[0\ 0\ 0\ 1]^T$, a predictive direction of gravity unit vector $\tilde{s}_{\hat{g}}$ relative to a predicted sensor frame $\tilde{s}$ may be obtained by applying equation [5] to obtain equation [9]:

$$\tilde{s}_{\hat{g}} = {}_E^S \hat{q}^* \otimes E_{\hat{g}} \otimes {}_E^S \hat{q} \qquad [9]$$

where $\tilde{s}_{\hat{g}}$ is a predicted projections of $E_{\hat{g}}$ given $_E^S \hat{q}$ to be true.

Likewise, a correction may be based on a comparison between a predicted a magnetic/compass heading and a measured compass heading. Given a magnetic heading unit vector $E_{\hat{b}}$, a predictive direction based on a magnetic heading direction unit vector $\tilde{s}_{\hat{b}}$ relative to a predicted sensor frame $\tilde{s}$ may be obtained by applying equation [5]:

$$\tilde{s}_{\hat{b}} = {}_E^S \hat{q}^* \otimes E_{\hat{b}} \otimes {}_E^S \hat{q} \qquad [10]$$

where $\tilde{s}_{\hat{b}}$ is a predicted projection of $E_{\hat{b}}$ given $_E^S \hat{q}$ to be true.

Figure 5:
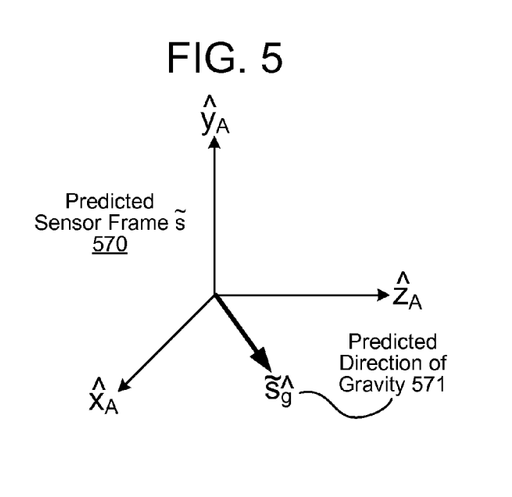
FIG. 5 illustrates an example of a predicted direction of gravity in a predicted sensor frame.
Figure 6:
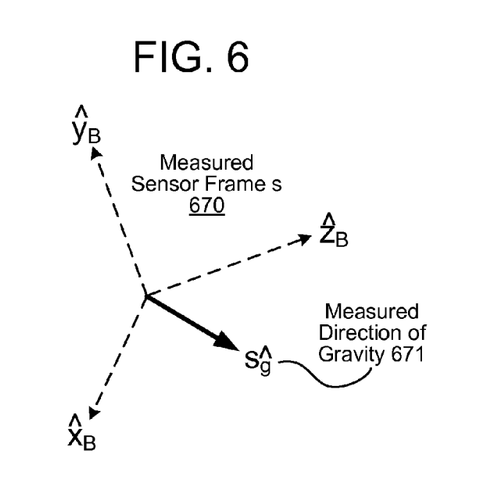
FIG. 6 illustrates an example of a measured direction of gravity in a sensor frame.

An example of the predicted sensor frame "$\tilde{s}$" 570 is illustrated in FIG. 5, which includes a predicted direction of gravity unit vector $\tilde{s}_{\hat{g}}$ 571, with the axes $\hat{x}_A$, $\hat{y}_A$, and $\hat{z}_A$ corresponding to the predicted device frame "$\tilde{s}$" 570. A measured "reality" sensor frame "s" 670 is illustrated in FIG. 6, where the measured direction of gravity vector $s_{\hat{g}}$ 671 corresponds to measurements from the three-axes accelerometer (or gravity sensor) defined in four dimensions as $[0\ a_x\ a_y\ a_z]^T$, and the axes $\hat{x}_B$, $\hat{y}_B$, and $\hat{z}_B$ correspond to the device sensor frame "s."

Notably, in the measured sensor frame 670, if gravity (i.e., the gravity vector $s_{\hat{g}}$ 671) is the only "fixed" direction that is measured (e.g., from accelerometer or gravity sensor), then the measured data will not verify the rotation of the axes $\hat{x}_B$, $\hat{y}_B$, and $\hat{z}_B$ around the gravity vector. In other words, referring back to FIG. 1, the orientation of the device relative to the down vector can be measured, but the device 100 can spin in the earth-frame tangent plane 180 without any change to the measured sensor frame 670, if the measured sensor frame 670 is based on "down" alone.

Figure 7:
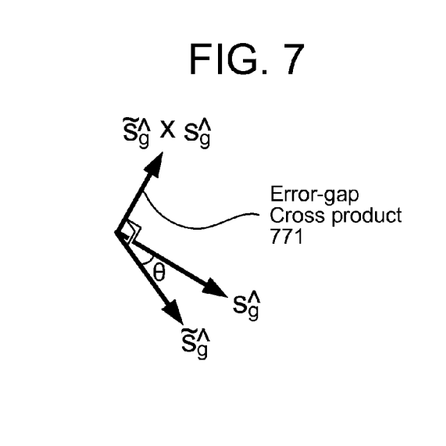
FIG. 7 illustrates a cross product of the predicted and measured directions of gravity.

As illustrated in FIG. 7, taking the cross product 771 of the predicted direction of gravity unit vector $\tilde{s}_{\hat{g}}$ 571 and the measured direction of gravity unit vector $s_{\hat{g}}$ 671 results in an "error gap" vector (a vector "$e_a$" equal to the cross product) perpendicular to both the predicted and measured unit vectors. The predicted and measured gravity unit vectors are different from each other by an angle of θ with respect to the perpendicular axis formed by the cross product $e_a$ 771.

The accelerometer contributes a correction corresponding to rotating the predicted device frame $\tilde{s}$ 570 by the angle θ times a jitter offset constant β with respect to the cross product axis vector 771, relative to the sensor frame s 670. This corrective frame rotation may be expressed as the quaternion $_S^S \hat{q}$, which describes an orientation of the predictive device frame g relative to a device sensor frame s, and is equal to the conjugate of the quaternion $_S^S \hat{q}$ 42, which describes the orientation of the sensor frame s relative to predicted frames.

The jitter offset constant β acts as a corrective-action smoothing factor to avoid instability due to accelerometer and/or magnetometer noise. Orientation filter designs sometimes employ probabilistic weighting to improve system stability, such as in orientation filters based on Kalman filters.

However, the orientation filter in device 100 makes direct corrections between the sensor frame and the predicted frame. While computationally less complex than systems that use probabilistic weighting, excessive accelerometer and/or magnetometer noise can produce jitter in the output of the orientation filter, absent a moderating factor. Uncontrolled jitter that produces a correction larger than will be compensated for on a next iteration can produce a false device spin in the output of the orientation filter, destabilizing the output of the orientation filter.

Empirically, the jitter offset constant β serves as a low pass filter, offsetting accelerometer and/or magnetometer noise. For example, to compensate for accelerometer noise, the constant β is determined based on accelerometer hardware noise characteristics when the accelerometer is quiescent (i.e., stationary and physical inactive), which may be measured prior to assembly of the device 100, after the device 100 is assembled, or periodically when the device 100 is inactive. Preferably, the constant is determined after device assembly at the time of manufacture.

The constant β has a value greater than or equal to zero and less than or equal to one. Preferably, the constant β has a value greater than zero and less than or equal to one. If there is no noise and the constant β equals one, the correction corresponds directly to the angle of θ and correction is fast. As the constant β is reduced, the contribution of the accelerometer and/or magnetometer to the correction is reduced and the speed of correction decreases. If accelerometer and/or magnetometer noise varies with operating condition such as ambient temperature, there may be more than one constant β, with the constant's value selected at runtime based on ambient conditions (e.g., by selecting the value from a stored table).

The constant β may be determined by performing a search, such as a binary search, to determine at what value accelerometer and/or magnetometer noise induces instability when the device 100 is quiescent. For example, starting at β=0.5, a determination may be made as to whether signals from the three-axes accelerometer induce a false rotation in the corrected orientation, and whether the rate of rotation exceeds a next correction (resulting in a noise-induced false spin). If not, β may be increased to 0.75, and another correction measured. This search may continue to determine a maximum value before spin begins. A smaller value may then be selected for β based on a jitter tolerance threshold. The jitter tolerance threshold may be a root mean square (RMS), or peak-to-peak displacement, quantifying the amount of false rotation between correction iterations. Other similar approaches may be used to determine β, such as conducting the search to determine a largest value at which β satisfies the jitter tolerance threshold.

Also, both values for β may be determined and stored (maximum $β_1$ that satisfies the jitter tolerance threshold and maximum $β_2$ without spin, where $β_1<β_2$) so that either of the device jitter characteristics may be selected at run time to provide either low jitter (i.e., $β_1$) or fast responsiveness (i.e., $β_2$). Intermediate values may be dynamically specified (e.g., stored as constants in accordance with system setting) between these two empirically determined values for β. However, if there is no hardware jitter, β equals one, correction includes no jitter correction, and responsiveness is maximized.

Figure 8:
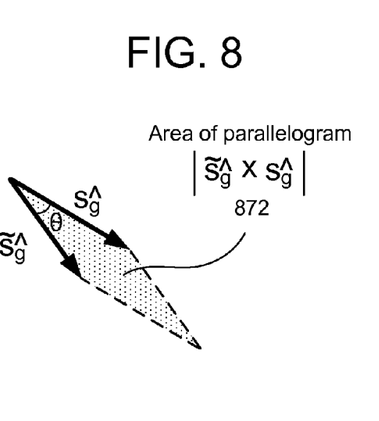
FIG. 8 illustrates the area of a parallelogram formed by vectors representing the direction of gravity from FIGS. 5 to 7.
Figure 9:
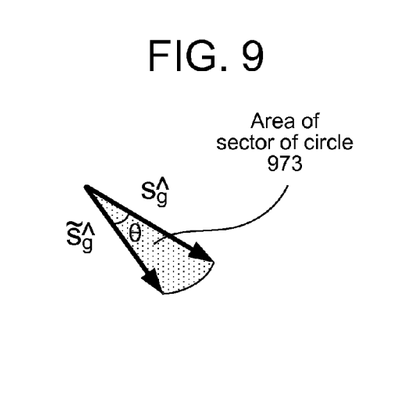
FIG. 9 illustrates the area of a sector of a circle formed by the vectors.

The quaternion $_S^{\hat{s}}\hat{q}$ corresponds to the axis rotation by the θ·β, and the angle θ may be approximated based on the area of the parallelogram 872 illustrated in FIG. 8 formed by the predicted and measured gravity unit vectors. Since the predicted and measured gravity vectors are unit vectors with a magnitude of one, one-half the area of the parallelogram 872 is approximately equal to the area of a sector of a circle 973 formed by angle θ, as illustrated in FIG. 9. The area of the sector of the circle 973 is formed by two lines (i.e., unit vectors 571, 671) extending from a center of the circle to a perimeter of the circle, the two lines separated at the center of the circle by the angle θ, the circle having a radius equal to the length of the unit vectors (i.e., a radius of one). This approximation is expressed in equation [11]:

$$\frac{\|\tilde{s}_{\hat{g}} \times s_{\hat{g}}\|}{2} \approx \frac{1}{2}\theta r^2 = \frac{1}{2}\theta \to \theta \approx \|\tilde{s}_{\hat{g}} \times s_{\hat{g}}\| \qquad [11]$$

such that the norm (i.e., magnitude) of the cross product is approximately equal to the angle between the predicted and measured direction-of-gravity unit vectors.

Normalizing the cross product $e_a$ 771 results in a cross-product unit vector $e_{\hat{a}}$. The x, y, and z components of the cross-product unit vector $e_{\hat{a}}$ are defined as $e_{\hat{x}}$, $e_{\hat{y}}$, and $e_{\hat{z}}$. The quaternion $_S^{\tilde{s}}\hat{q}$, which corresponds to the axis rotation of the frames, is expressed in equation [12]:

$$_S^{\tilde{s}}\hat{q} = \begin{bmatrix} \cos(\theta \cdot \beta/2) \\ e_{\hat{x}}\sin(\theta \cdot \beta/2) \\ e_{\hat{y}}\sin(\theta \cdot \beta/2) \\ e_{\hat{z}}\sin(\theta \cdot \beta/2) \end{bmatrix} \text{ where } 0 \le \beta \le 1 \qquad [12]$$

which describes the orientation of device sensor frame relative to the predicted frame.

The orientation filter uses this result to reorient to Earth reference frame based on the predicted sensor frame represented by a quaternion $_E^S\hat{q}$ generated from interpolated gyroscope data. Specifically, this result is expressed in equation [13] as:

$$_E^S\hat{q} = _E^{\tilde{s}}\hat{q} \otimes _S^{\tilde{s}}\hat{q} = _E^{\tilde{s}}\hat{q} \otimes _S^{\tilde{s}}\hat{q}^* \qquad [13]$$

which describes how Earth reference frame looks from the sensor frame. In equation [13], the quaternion $_S^{\tilde{s}}\hat{q}$ is the conjugate of the axis-angle quaternion determined in equation [12], and the quaternion $_E^S\hat{q}$ is the "updated" orientation, which is normalized to obtain the corrected orientation "result."

These equations may be continually updated with new data over time. Although corrections may be made by independently predicting orientation on each iterative "pass" when new gyroscope data is available, if the corrections are made in recursive iterations, as will be discussed further below, this result may be combined with rotational data from the gyroscopes on the next pass to generate a new prediction and improve overall performance.

If the device 100 includes an IMU but no magnetometer, equation [7] may convey the angular rate sampled from the IMU's gyroscope's at time "t", as expressing in equation [14]:

$$s_{\omega_t} \triangleq [0 \quad \omega_x \quad \omega_y \quad \omega_z]^T \qquad [14]$$

The derivative quaternion from equation [8] may be implemented as:

$$_E^{\tilde{S}}\hat{q}_{\omega,t} = \frac{1}{2} {}_E^S \hat{q}_{est,t-1} \otimes s_{\omega_t} \quad [15]$$

where ${}_E^S\hat{q}_{est,t-1}$ is the previous corrected result of the algorithm. The gyroscope data $s_{\omega_t}$ expresses how fast the device 100 is rotating/spinning, and may either be raw gyroscope data or gyroscope data corrected for bias.

The derivative of equation [15] is summed with the previous result to determine a predicted frame orientation:

$$_E^{\tilde{S}}\hat{q}_t = {}_E^S \hat{q}_{est,t-1} + {}_E^{\tilde{S}} \hat{q}_{\omega,t} \cdot \Delta t \quad [16]$$

where $\Delta t$ is the sampling rate at which gyroscope data from the IMU is updated. The gyroscope data is accurate in the short-term and ideal for near-instantaneous updates, whereas the accelerometer data is noisy in the short-term, but with filtering, stable in the long-term. The result of equation [16] is a computational hypothesis quaternion representing the orientation of the fixed Earth reference frame relative to a predicted sensor frame. This "prediction" is not validated from reality, but has predictive value for interpolating an orientation of the reference frame relative to the sensor frame over time.

To test and correct this hypothesis, a predicted sensor direction is compared with a measured sensor direction. Applying equation [9], the predicted direction of gravity $\tilde{s}_{\hat{g}}$ 571 is expressed as:

$$\tilde{s}_{\hat{g}} = {}_E^{\tilde{S}}\hat{q}^*_{est,t-1} \otimes E_{\hat{g}} \otimes {}_E^{\tilde{S}}\hat{q}_{est,t-1} \quad [17]$$

where $E_{\hat{g}}$ is equal to $[0\ 0\ 0\ 1]^T$ as the gravity vector in Earth reference frame, as illustrated in FIG. 5.

In accordance with equation [6], ${}_E^S\hat{q}_{est,t-1}$ is a matrix equal to $[q_1\ q_2\ q_3\ q_4]^T$. Utilizing equations [2], [4], [6], and [17], the predicted direction of gravity $\tilde{s}_{\hat{g}}$ reduces to:

$$\tilde{s}_{\hat{g}} = \begin{bmatrix} 0 \\ 2(q_2 q_4 - q_1 q_3) \\ 2(q_1 q_2 + q_3 q_4) \\ q_1^2 - q_2^2 - q_3^2 + q_4^2 \end{bmatrix} \quad [18]$$

The measured gravity unit vector $s_{\hat{g}}$ 671 is the three-axis raw accelerometer data $[a_x\ a_y\ a_z]$, represented by an acceleration vector $s_a$, normalized in the x, y, and z axes as illustrated in FIG. 6 and defined in equations [19] and [20]:

$$s_a \triangleq [0\ a_x\ a_y\ a_z]^T \quad [19]$$

$$s_{\hat{g}} = \frac{s_a}{\|s_a\|} \quad [20]$$

Based on the above notation, the z axis is pointing down to the ground and the x axis is pointing South in the fixed Earth reference frame. The results of equations [18] and [20] form the basis for testing of the hypothesis from equation [16].

An "error gap" is determined based on a cross-product $e_a$ 771 resulting from $\tilde{s}_{\hat{g}} \times s_{\hat{g}}$, which is the vector cross-product of the predicted direction of gravity 571 from equation [18] and the measured "reality" direction of gravity 671 from equation [20]. If the cross-product $e_a$ 771 result in a zero value, the predicted frame matches "reality" and no correction is required. If the result is a non-zero value, the orientation filter proceeds to make a correction.

In an example of a prior art approach to determining that there is a difference between an expected result and the measured result, no cross-product of the predicted and measured directions is determined. Instead, any difference on each of the x, y, and z axes would be subtracted from the predicted result as a correction to eliminate the "gap" in the data. In comparison, in the present algorithm, the cross product of the predicted sensor vector and reality sensor vector are utilized, determining a correction corresponding to rotating the predicted frame around the axis of the cross-product (771 in FIG. 7) based on the angle $\theta$ times the jitter offset constant $\beta$. If the constant $\beta$ equals one, this correction corresponds to aligning the predicted sensor vector 571 with the measured vector 671.

Figure 10:
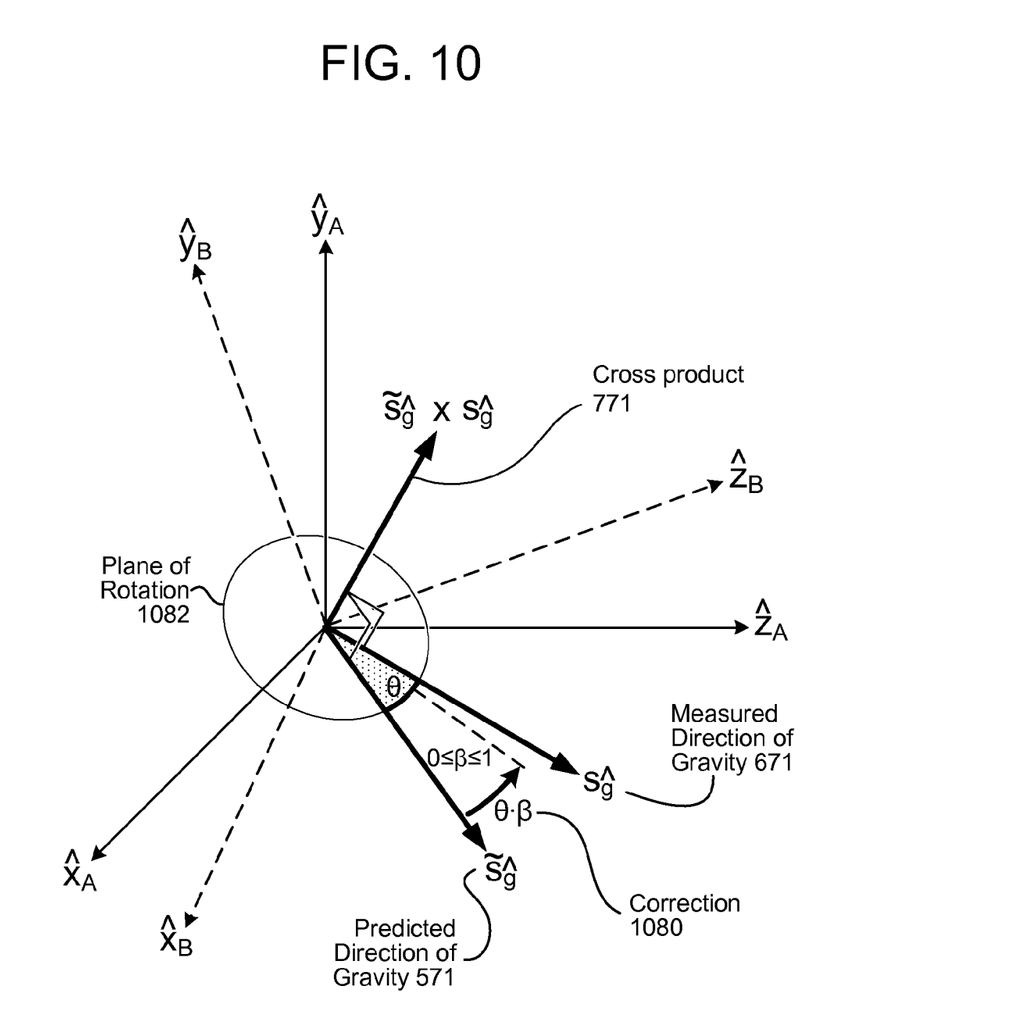
FIG. 10 illustrates a correction made to the predicted frame relative to the sensor frame.

This correction 1080 is further illustrated in FIG. 10, where the predicted sensor frame 570 (axes $\hat{x}_A$, $\hat{y}_A$, and $\hat{z}_A$) is rotated around the "error gap" cross-product vector 771 in the plane of rotation 1082 by the $\theta \cdot \beta$, as the predicted direction of gravity 571 is realigned toward the measured direction of gravity 671. Even if the constant $\beta$ equals one, such that the predicted direction of gravity 571 realigns with the measured direction of gravity 671, the correction 1080 does not necessarily result in the predicted sensor frame (axes $\hat{x}_A$, $\hat{y}_A$, and $\hat{z}_A$) aligning exactly with the measured sensor frame 670 (axes $\hat{x}_B$, $\hat{y}_B$, and $\hat{z}_B$). As a result, corrections avoid carrying instabilities from the measured accelerometer and/or magnetometer data directly into the results, as may occur in solutions that subtract the difference between the predicted and measured frames as the correction.

Applying equations [2], [11], and [12] results in:

$$_S^{\tilde{S}}\hat{q}_t = {}_S^{\tilde{s}} \hat{q}^*_t = \begin{bmatrix} \cos(\theta \cdot \beta/2) \\ -e_{\hat{x}} \sin(\theta \cdot \beta/2) \\ -e_{\hat{y}} \sin(\theta \cdot \beta/2) \\ -e_{\hat{z}} \sin(\theta \cdot \beta/2) \end{bmatrix} \text{ where } 0 \leq \beta \leq 1 \quad [21]$$

representing a correction of the predicted device frame relative to the device sensor frame, where angle $\theta$ is again determined as described by equation [11], approximating the angle $\theta$ in radians as the norm (i.e., magnitude) of the cross product $e_a$ 771, based on the area of the parallelogram 872 being approximated equal to twice the area of the sector of the circle 973. The unit vectors $e_{\hat{x}}$, $e_{\hat{y}}$, and $e_{\hat{z}}$ are the x, y, and z components of the normalized cross-product unit $e_{\hat{a}}$, which may be obtained by dividing $e_a$ by its norm.

The updated orientation is based on equation [13], compounding the predicted orientation from equation [16] based on gyroscope data with the correction from equation [21], which becomes:

$$_E^S q_t = {}_E^{\tilde{S}} \hat{q}_t \otimes {}_S^{\tilde{S}} \hat{q}_t \quad [22]$$

which is then normalized as the iteration's result:

$$_E^S\hat{q}_t = \frac{_E^S\hat{q}_t}{\|_E^S\hat{q}_t\|} \quad [23]$$

where $_E^S\hat{q}_t$ describes how Earth reference frame looks from the device sensor frame, and which becomes $_E^S\hat{q}_{est,t-1}$ in the next recursive iteration of the algorithm. The output to the device's user interface and/or software applications may be the orientation of the Earth reference frame relative to the sensor frame, as expressed in equation [23], or the conjugate (e.g., equation [2]) may be used to output the orientation of the device sensor frame relative to the Earth reference frame.

This process may be repeated every iteration in which there is new acceleration data. With each iteration, the predicted frame stabilizes over time toward an accurate representation of reality with greater accuracy than is obtained from measured frames alone.

Among other advantages of this approach is that the correction is mathematically more correct than prior art solutions. Moreover, whereas prior art systems require calibration to tune a proportional-integral-derivative (PID) controller to establish PID constants, the improved orientation filter is able to make corrections without such calibration by virtue of its frame rotation realignment based on the angle θ.

If the device 100 includes a magnetometer, the magnetometer data may be incorporated to provide magnetic field correction. Since a magnetic field associated with Earth's North can easily be distorted by nearby fringe fields, the magnetometer's contribution assumes less certainty in its raw measurement, by applying a method of gradient descent between an expected sensor value and the magnetometer data.

The magnetometer's contribution may be determined by solving equation [8] for equation [10] to determine update quaternion $_E^S\dot{q}_{\omega,b,t}$, which replaces equation [15] as described above, with the derivative from equation [27] inserted into equation [16] to obtain:

$$_E^S\hat{q}_t = {_E^S\hat{q}_{est,t-1}} + {_E^S\dot{q}_{\omega,b,t}} \cdot \Delta t \quad [24]$$

as the predicted orientation based on both magnetic field and rotational rate data. This predicted orientation is then updated as described above in equation [22], utilizing the correction based on θ obtained from equation [21]. For a more detailed discussion of solving for the magnetic field quaternion $_E^S\dot{q}_{\omega,b,t}$ contribution by gradient descent for orientation filter correction, see, e.g., Section 3.2 of the incorporated 2010 paper by Madgwick.

Figure 11:
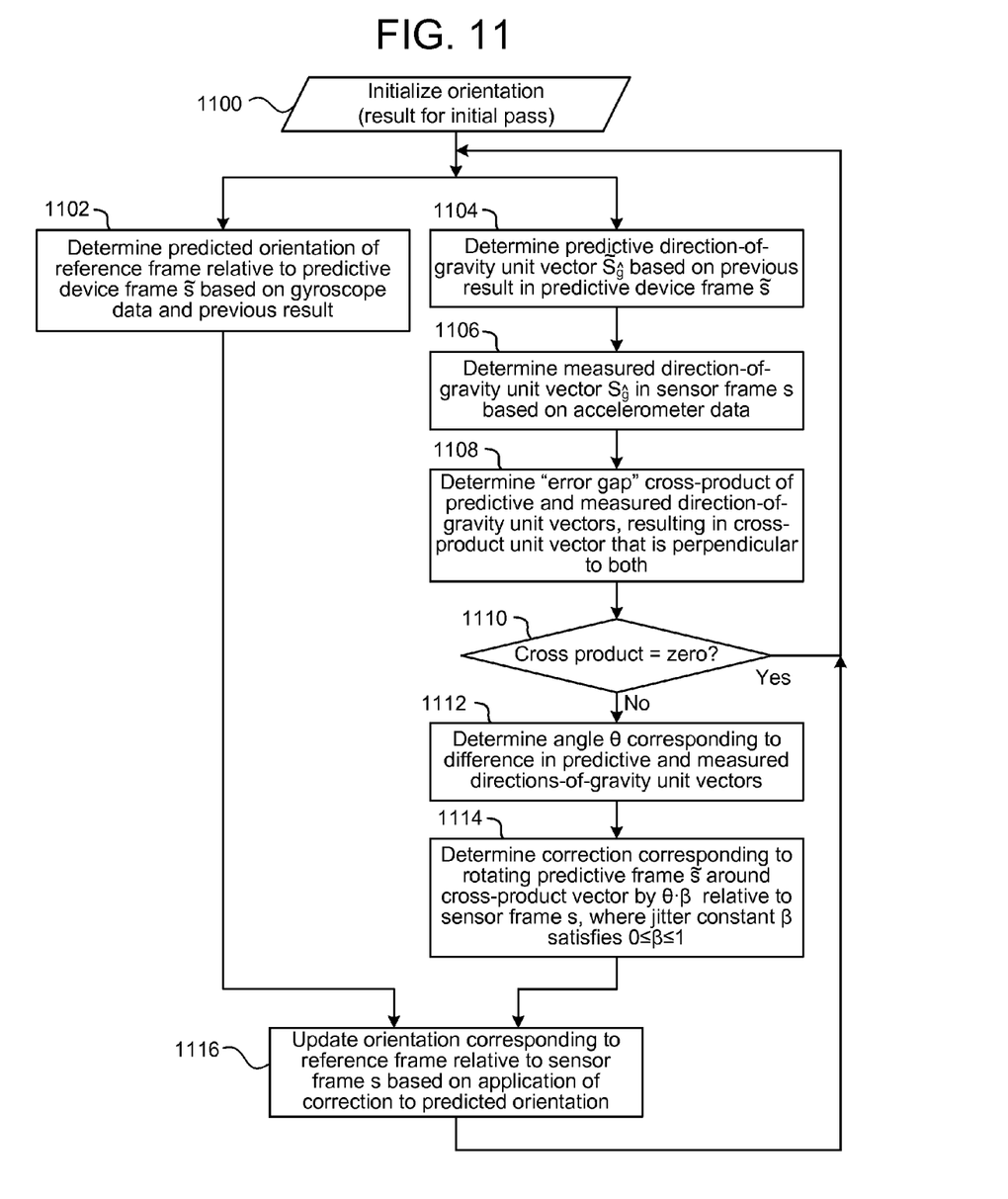
FIG. 11 illustrates an example process flow of the system.

FIG. 11 illustrates an example process flow executed by the orientation filter of the device 100. The initial orientation is set 1100, providing the "result" for the first iteration/pass of the process. This initial result may be based on unverifiable IMU readings (e.g., magnetometer, gravity) or some other default value. The initial predicted orientation is not critical, as the process will converge toward a stable and accurate prediction.

An orientation of the reference frame (e.g., Earth reference frame) relative to the device frame is determined (1102) based on the previous result and the gyroscope data, as expressed by equation [16].

A predictive direction-of-gravity unit vector is determined (1104) based on the previous orientation result and a vector representing the direction of gravity, as illustrated in FIG. 5 and expressed by equations [17] and [18].

A measured "reality" direction-of-gravity unit vector is determined (1106) based on the accelerometer data, as illustrated in FIG. 6 and expressed in equation [20]

An "error gap" cross-product of the predictive unit vector and the measured "reality" vector is calculated (1108), resulting in an error-gap cross-product vector 771 as illustrated in FIG. 7, that is perpendicular to both the predictive and measured vectors.

The error-gap cross-product represents the how much of a gap exists to fuse based on the predicted direction of gravity determined based on the orientation results of the previous iteration and what the direction of gravity is now measured to be. If the error-gap cross product is zero (1110 "Yes"), then there is no need for correction, and the process is performed again when new accelerometer data is available. If the cross product is not zero (1110 "No"), then the angle θ corresponding to a difference between directions of the predictive and measured direction-of-gravity unit vectors is determined (1112). This angle may be approximated as expressed by equation [11] based on the twice the area of the sector of the circle 973 in FIG. 9 being approximately equal to the area of the parallelogram 872 formed by the predicted gravity vector 571 and measured gravity vector 671.

A correction 1080 is determined (1114) corresponding to rotating the predictive device frame 570 around the cross-product vector by the angle θ times the jitter constant β, relative to the measured sensor frame 670, as illustrated in FIG. 10 and expressed by equation [21].

An updated orientation of the reference frame relative to the device frame is determined (1116) by compounding the predicted orientation based on gyroscope data (1102) with the correction (1114), as expressed in equation [22], and normalizing the result, as expressed in equation [23].

The process then returns to steps 1102 and/or 1104, with the process being executed again when new accelerometer data is received. When the process repeats, the predicted orientation of the device is based on updated gyroscope data of the respective iteration and the corrected predicted orientation from the preceding iteration (from equation [23]). As illustrated in FIG. 11, the order of steps predicting the orientation (1102) and determining the correction (1104 to 1114) may be performed independently of each other, such that the predicted orientation (1102) may be determined before, after, or during the determination of the observation-based correction (1104 to 1114).

Figure 12:
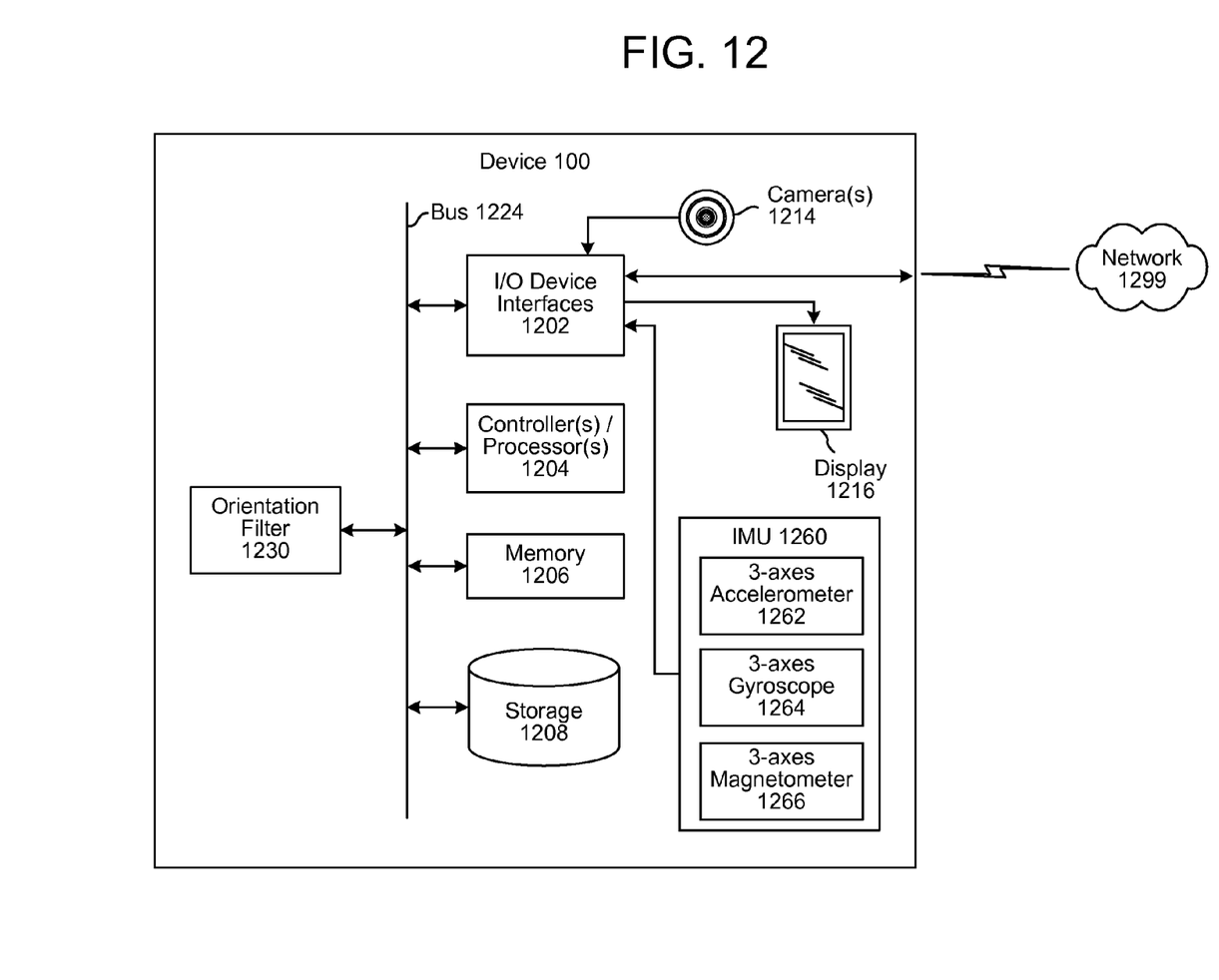
FIG. 12 is a block diagram conceptually illustrating example components of device of the system of FIG. 1.

FIG. 12 is a block diagram conceptually illustrating example components of the device 100. In operation, the device 100 may include computer-readable and computer-executable instructions that reside on the device 100, as will be discussed further below.

The device 100 may include, among other things a video input device such as camera(s) 1214, and a video output device for displaying images, such as display 1216. The video output device may be a display of any suitable technology, such as a liquid crystal display, an organic light emitting diode display, electronic paper, an electrochromic display, or other suitable component(s).

The device 100 may include an address/data bus 1224 for conveying data among components of the device 100. Each component within the device 100 may also be directly connected to other components in addition to (or instead of) being connected to other components across the bus 1224.

The device 100 may include one or more controllers/processors 1204, that may each include a central processing unit (CPU) for processing data and computer-readable instructions, and a memory 1206 for storing data and instructions. The memory 1206 may include volatile random access memory (RAM), non-volatile read only memory (ROM), non-volatile magnetoresistive (MRAM) and/or other types of memory. The device 100 may also include a data storage component 1208, for storing data and controller/processor-executable instructions (e.g., instructions to perform the algorithms illustrated in FIGS. 1 and 11 and associated equations presented above). The data storage component 1208 may include one or more non-volatile storage types such as magnetic storage, optical storage, solid-state storage, etc. The device 100 may also be connected to removable or external non-volatile memory and/or storage (such as a removable memory card, memory key drive, networked storage, etc.) through the input/output device interfaces 1202.

Computer instructions for operating the device 100 and its various components may be executed by the controller(s)/processor(s) 1204, using the memory 1206 as temporary "working" storage at runtime. The computer instructions and a table storing the jitter constant β may be stored in a non-transitory manner in non-volatile memory 1206, storage 1208, or an external device. Alternatively, some or all of the executable instructions may be embedded in hardware or firmware in addition to or instead of software.

The device 100 includes input/output device interfaces 1202. A variety of components may be connected through the input/output device interfaces 1202, such as the camera(s) 1214 and the display 1216. The input/output device interfaces 1202 may also include an interface for an external peripheral device connection such as universal serial bus (USB), FireWire, Thunderbolt or other connection protocol. The input/output device interfaces 1202 may also include a connection to one or more networks 1299 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 100 further includes an IMU 1260 that includes at least a three-axes accelerometer 1262, a three-axes gyroscope 1264, and a three-axes magnetometer 1166. As noted above, the IMU 1260 may also comprise a dedicated three-axis gravity sensor (not illustrated) dedicated to determining the measured direction of gravity. The thermal sensor and/or an air-pressure sensor (not illustrated) may be included to compensate for temperature-based and atmospheric pressure-based variations that may influence the data from other IMU components.

The orientation filter 1230 performs the processes and calculations disclosed above, receiving sensor data from the IMU 1260, the jitter offset constant value β from storage 1208, etc., and outputting updates (e.g., equation [23] or its conjugate) conveying the orientation of the reference frame relative to the device frame, or the conjugate orientation of the device frame relative to the reference frame. The orientation filter 1230 corrects the predicted reference frame data based on data from the gyroscopes 1264 using data from the accelerometers 1262 (and in some implementations, from the magnetometers 1266) in accordance with the disclosed equations.

If the device 100 periodically determines an accelerometer and/or magnetometer jitter offset constant β when the device is quiescent (e.g., rather than relying on a stored value or values determined at the time of device manufacture), the search to determine β may be performed by the orientation filter 1230 using a jitter tolerance threshold value stored storage 1208. In addition, the accelerometer and/or magnetometer jitter constant β and/or the jitter tolerance threshold value may be selected based on stored device settings (e.g., operating system configurable settings, etc.). For example, if the orientation filter 1230 periodically calculates β when the device is quiescent or is selecting β from a stored table, an operating system setting may enable a device user or application to determine a value for β based for reduced jitter and slower responsiveness (e.g., useful if using inertial orientation to control interaction with a drawing application), or a value of β that results in increased jitter but faster orientation filter responsiveness (e.g., useful if playing some games). Whether the device is quiescent may be based on an activity timer indicating a time since the device was last used, combined with data from IMU 1260. If accelerometer and/or magnetometer noise depends in part on ambient factors such as temperature, data from sensors such as the thermal sensor may be used to adjust or select the jitter offset constant β.

The device 100 may also include a user tracking system, such as a head tracking system, or other camera or visual based tracking system (not illustrated) that may be used to determine orientation of the device 100 relative to items detected by the camera(s) 1214. Orientation data determined by a camera-based tracking system may be combined with or processed in a similar manner to the IMU data discussed above to assist the device 100 in processing motion and/or changes in orientation.

The concepts disclosed herein may be applied within a number of different devices and computer systems, including, for example, remote controls, "smart" phones, laptop computers, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of mobile computers, orientation filters, and inertial navigation systems should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, portions of the orientation filter 1230 may be implemented in hardware, such arithmetic logic to apply the various vector matrix transforms.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   determining a first predicted change of orientation of a device over time by compounding a product of one-half times a previous corrected orientation with first rotational rate data based on first gyroscope data from a three-axis gyroscope of the device;

determining a first predicted orientation expressing an orientation of an Earth reference frame relative a first predicted frame of the device by adding the previous corrected orientation to a product of the first predicted change of orientation over time multiplied by a sampling rate of the three-axis gyroscope;

determining a first predictive unit vector representing a first predicted direction of gravity based on compounding a conjugate of the previous corrected orientation with a gravity vector and with the previous corrected orientation;

determining a first measured unit vector representing a first measured direction of gravity of the device based on first accelerometer data from a three-axis accelerometer of the device;

determining a first cross-product of the first predictive unit vector and the first measured unit vector, the first cross-product resulting in a first cross-product vector that is perpendicular to both the first predicted direction of gravity and the first measured direction of gravity;

determining a first angle corresponding to a difference between the first predicted direction of gravity and the first measured direction of gravity;

determining a first correction comprising a rotation of the first predicted frame of the device around the first cross-product unit vector in a sensor frame of the device by the first angle times an accelerometer jitter offset constant that is greater than zero and less than or equal to one, the accelerometer jitter offset constant set based on noise characteristics of the three-axis accelerometer; and determining a first corrected orientation of the device based on compounding the first predicted orientation with the first correction, the first corrected orientation expressing the Earth reference frame relative to the sensor frame.

2. The computer-implemented method of claim 1, wherein determining the first angle comprises:

determining an area of a parallelogram formed by the first predictive unit vector and the first measured unit vector based on a magnitude of the first cross-product, a length of each unit vector being equal; and determining the first angle based on the area of the parallelogram being approximately equal to twice an area of a sector of a circle formed by two lines extending from a center of the circle to a perimeter of the circle, the two lines separated at the center of the circle by the first angle, the circle having a radius equal to the length of the unit vectors.

3. The computer-implemented method of claim 1, further comprising:

receiving second accelerometer data;

determining a second predicted change of orientation of the device over time by compounding a product of one-half times the first corrected orientation with second rotational rate data based on second gyroscope data from the three-axis gyroscope of the device;

determining a second predicted orientation expressing an orientation of the Earth reference frame relative a second predicted frame of the device by adding the first corrected orientation to a product of the second predicted change of orientation over time multiplied by the sampling rate of the of the three-axis gyroscope;

determining a second predictive unit vector representing a second predicted direction of gravity based on compounding a conjugate of the first corrected orientation with the gravity vector and with the first corrected orientation;

determining a second measured unit vector representing a second measured direction of gravity of the device based on the second accelerometer data from the three-axis accelerometer;

determining a second cross-product of the second predictive unit vector and the second measured unit vector, the second cross-product resulting in a second cross-product vector that is perpendicular to both the second predicted direction of gravity and the second measured direction of gravity;

determining a second angle corresponding to a difference between the second predicted direction of gravity and the second measured direction of gravity;

determining a second correction comprising a rotation of the second predicted frame of the device around the second cross-product unit vector in the sensor frame of the device by the second angle times the accelerometer jitter offset constant; and determining a second corrected orientation of the device based on compounding the second predicted orientation with the second correction, the second corrected orientation expressing the Earth reference frame relative to the sensor frame of the device.

4. A computing device comprising:

at least one processor;

a gyroscope;

an accelerometer;

a memory including instruction operable to be executed by the at least one processor to perform a set of actions to:

determine a first predicted change of orientation of the computing device based on a previous corrected orientation of the computing device and on first gyroscope data;

determine a first predicted orientation of a reference frame relative to a first predicted frame of the computing device based on the previous corrected orientation and on the first predicted change of orientation;

determine a first predicted acceleration direction of the computing device based on the previous corrected orientation of the computing device;

determine a first measured acceleration direction of the computing device based on first accelerometer data;

determine a first axis perpendicular to both the first predicted acceleration direction and the first measured acceleration direction;

determine a first angle corresponding to a first difference between the first predicted acceleration direction and the first measured acceleration direction;

determine a first correction corresponding to a first rotation of the first predicted frame of the computing device around the first axis relative to a sensor frame of the computing device based on the first angle; and determine a first corrected orientation expressing the reference frame relative to the sensor frame by applying the first correction to the first predicted orientation.

5. The computing device of claim 4, wherein the reference frame is an Earth reference frame with orthogonal axes corresponding to North, East, and down.

6. The computing device of claim 4, wherein the first predicted acceleration direction is a predicted direction of gravity.

7. The computing device of claim 4, wherein:
the instructions to determine the first predicted orientation include instructions to determine a first quaternion representing the reference frame relative to the first predicted frame;
the instructions to determine the first correction include instructions to determine a second quaternion representing the first predicted frame relative to the sensor frame; and
the instructions to determine the first corrected orientation include instructions to:
determine a quaternion product of the first quaternion and the second quaternion; and
normalize the quaternion product,
wherein the first corrected orientation is based on the normalized quaternion product.

8. The computing device of claim 4, wherein:
the instructions to determine the first predicted acceleration direction include instructions to determine a predictive unit vector representing the first predicted acceleration direction in the first predicted frame based on the previous corrected orientation and a gravity vector in the reference frame;
the instruction to determine the first measured acceleration direction include instructions to determine a measured unit vector representing the first measured acceleration direction in the sensor frame; and
the instructions to determine the first axis include instructions to determine a cross product of the predictive unit vector and the measured unit vector, the first axis corresponding to the cross-product.

9. The computing device of claim 8, wherein instructions configure the at least one processor to determine the first angle based on an area of a parallelogram formed by the predicted unit vector and the measured unit vector.

10. The computing device of claim 9, wherein the area of the parallelogram is approximated as being twice an area of a sector of a circle spanning the angle and having a radius of one.

11. The computing device of claim 4, wherein the instructions further configure the at least one processor to:
determine a second predicted orientation of the reference frame relative to a second predicted frame of the computing device based on the first corrected orientation and second gyroscope data;
determine a second predicted acceleration direction of the computing device based on the first corrected orientation;
determine a second measured acceleration direction of the computing device based on second accelerometer data;
determine a second axis perpendicular to both the second predicted acceleration direction and the second measured acceleration direction;
determine a second angle corresponding to a second difference between the second predicted acceleration direction and the second measured acceleration direction;
determine a second correction corresponding to a second rotation of the second predicted frame of the computing device around the second axis relative to the sensor frame of the computing device based on the second angle; and
determine a second corrected orientation expressing the reference frame relative to the sensor frame by applying the second correction to the second predicted orientation.

12. The computing device of claim 11, wherein the second predicted acceleration direction is further based on a gravity vector in the reference frame.

13. A method comprising:
determining a first predicted change of orientation of a computing device based on a previous corrected orientation of the computing device and on first gyroscope data;
determining a first predicted orientation of a reference frame relative to a first predicted frame of the computing device based on the previous corrected orientation and on the first predicted change of orientation;
determining a first predicted acceleration direction of the computing device based on the previous corrected orientation of the computing device;
determining a first measured acceleration direction of the computing device based on first accelerometer data;
determining a first axis perpendicular to both the first predicted acceleration direction and the first measured acceleration direction;
determining a first angle corresponding to a first difference between the first predicted acceleration direction and the first measured acceleration direction;
determining a first correction corresponding to a first rotation of the first predicted frame of the computing device around the first axis relative to a sensor frame of the computing device based on the first angle; and
determining a first corrected orientation expressing the reference frame relative to the sensor frame by applying the first correction to the first predicted orientation.

14. The method of claim 13, wherein the reference frame is an Earth reference frame with orthogonal axes corresponding to North, East, and down.

15. The method of claim 13, wherein the first predicted acceleration direction is a predicted direction of gravity.

16. The method of claim 13, wherein:
determining the first predicted orientation comprises determining a first quaternion representing the reference frame relative to the first predicted frame;
determining the first correction comprises determining a second quaternion representing the first predicted frame relative to the sensor frame; and
determining the first corrected orientation comprises:
determining a quaternion product of the first quaternion and the second quaternion; and
normalizing the quaternion product,
wherein the first corrected orientation is based on the normalized quaternion product.

17. The method of claim 13, wherein:
determining the first predicted acceleration direction comprises determining a predictive unit vector representing the first predicted acceleration direction in the first predicted frame based on the previous corrected orientation and a gravity vector in the reference frame;
determining the first measured acceleration direction comprises determining a measured unit vector representing the first measured acceleration direction in the sensor frame; and
determining the first axis comprises determining a cross product of the predictive unit vector and the measured unit vector, the first axis corresponding to the cross-product.

18. The method of claim 17, wherein determining the first angle is based on an area of a parallelogram formed by the predicted unit vector and the measured unit vector.

19. The method of claim 18, wherein the area of the parallelogram is approximated as being twice an area of a sector of a circle spanning the angle and having a radius of one.

20. The method of claim 13, further comprising:
- determining a second predicted orientation of the reference frame relative to a second predicted frame of the computing device based on the first corrected orientation and second gyroscope data;
- determine a second predicted acceleration direction of the computing device based on the first corrected orientation;
- determine a second measured acceleration direction of the computing device based on second accelerometer data;
- determine a second axis perpendicular to both the second predicted acceleration direction and the second measured acceleration direction;
- determine a second angle corresponding to a second difference between the second predicted acceleration direction and the second measured acceleration direction;
- determine a second correction corresponding to a second rotation of the second predicted frame of the computing device around the second axis relative to the sensor frame of the computing device based on the second angle; and
- determine a second corrected orientation expressing the reference frame relative to the sensor frame by applying the second correction to the second predicted orientation.

* * * * *